US009541104B2

(12) United States Patent
McEvoy et al.

(10) Patent No.: US 9,541,104 B2
(45) Date of Patent: Jan. 10, 2017

(54) INERTIALLY STABLE ACTUATOR WITH TELESCOPING SUPPLY PORT

(71) Applicant: GE Oil & Gas Pressure Control LP, Houston, TX (US)

(72) Inventors: Travis Kyle McEvoy, Houston, TX (US); Keith Adams, Houston, TX (US)

(73) Assignee: GE Oil & Gas Pressure Control LP, Houston, TX (US)

( * ) Notice: Subject to any disclaimer, the term of this patent is extended or adjusted under 35 U.S.C. 154(b) by 127 days.

(21) Appl. No.: 14/275,602

(22) Filed: May 12, 2014

(65) Prior Publication Data

US 2015/0198186 A1 Jul. 16, 2015

Related U.S. Application Data

(60) Provisional application No. 61/928,115, filed on Jan. 16, 2014.

(51) Int. Cl.
*F16K 31/122* (2006.01)
*F15B 15/14* (2006.01)

(52) U.S. Cl.
CPC ......... *F15B 15/1476* (2013.01); *F15B 15/149* (2013.01); *F16K 31/1221* (2013.01); *F16K 31/1226* (2013.01)

(58) Field of Classification Search
CPC .... F15B 15/16; F16K 31/1226; F16K 31/1221
USPC ....................... 251/63.6, 63.5, 62
See application file for complete search history.

(56) References Cited

U.S. PATENT DOCUMENTS

| 1,209,355 | A |   | 12/1916 | Sutherland |
| 2,415,181 | A |   | 2/1947  | Johnson |
| 2,837,029 | A |   | 6/1958  | Mohnkern |
| 3,065,949 | A | * | 11/1962 | De Frees ............ F16K 31/1221 251/144 |
| 3,086,745 | A |   | 4/1963  | Natho |

(Continued)

FOREIGN PATENT DOCUMENTS

GB    2254658 A    10/1992

OTHER PUBLICATIONS

International Search Report and Written Opinion issued in connection with corresponding PCT Application No. PCT/US2015/011346 dated May 6, 2015.

*Primary Examiner* — Craig Schneider
*Assistant Examiner* — Andrew J Rost
(74) *Attorney, Agent, or Firm* — Hogan Lovells US LLP

(57) ABSTRACT

An apparatus for actuating a valve includes an actuator body with a proximal end having a connector for coupling to a valve assembly, and a distal end. A piston assembly having a piston disposed in a piston cylinder is located within the proximal end of the actuator body. A telescoping port assembly extends from the distal end to the piston assembly, the telescoping port assembly having an inner telescoping member and an outer telescoping member. The outer telescoping member has an inner cavity that reciprocatingly receives an end of the inner telescoping member. A bore extends axially through the telescoping port assembly and communicates pressure from a pressure source to the piston cylinder, so that when a pressure media is supplied from the pressure source to the bore, the piston actuates the valve assembly, and the outer telescoping member telescopes outward from the inner telescoping member.

20 Claims, 3 Drawing Sheets

(56) References Cited

U.S. PATENT DOCUMENTS

| | | | |
|---|---|---|---|
| 3,168,853 A | | 2/1965 | Prince |
| 4,311,297 A | * | 1/1982 | Barrington ............... E21B 34/04 |
| | | | 137/236.1 |
| 4,643,390 A | * | 2/1987 | Karr, Jr. ................ F16K 31/143 |
| | | | 251/337 |
| 4,750,408 A | | 6/1988 | Stoll |
| 4,840,347 A | | 6/1989 | Ariizumi et al. |
| 4,907,495 A | | 3/1990 | Sugahara |
| 4,967,785 A | * | 11/1990 | Young ................. F16K 31/1221 |
| | | | 137/315.04 |
| 5,755,428 A | * | 5/1998 | Ollivier .................. F16K 41/12 |
| | | | 251/331 |
| 6,041,804 A | | 3/2000 | Chatufale |
| 6,783,107 B2 | * | 8/2004 | Chatufale ................. F15B 1/24 |
| | | | 251/54 |
| 8,448,432 B2 | | 5/2013 | Bresie |
| 2003/0037544 A1 | | 2/2003 | Armstrong |

\* cited by examiner

INERTIALLY STABLE ACTUATOR WITH TELESCOPING SUPPLY PORT

CROSS REFERENCE TO RELATED APPLICATION

This application claims priority to and the benefit of co-pending U.S. Provisional Application Ser. No. 61/928,115, filed Jan. 16, 2014, titled "Inertially Stable Actuator With Telescoping Supply Port," the full disclosure of which is hereby incorporated herein by reference in its entirety for all purposes.

BACKGROUND

1. Field of Invention

This invention relates in general to valve actuators, and in particular to a hydraulic actuator with a telescoping supply port.

2. Description of Prior Art

Valves can sometimes have a linearly translating member, such as a stem, to move the valve between the open and closed positions. Some valves, such as gate valves, have an aperture that aligns with the bore to allow flow through the valve. The valve can be normally open, and thus the valve is closed when it is moved linearly to push the aperture out of alignment with the bore. Alternatively, a valve can be normally closed, and thus the valve is opened when it is moved linearly to position the aperture into alignment with the bore. Regardless of whether the valve is normally open or normally closed, the valve can be actuated, or moved between the open and closed position, by a valve actuator.

Current valve actuators can have a piston located at the distal end of the valve actuator, opposite the end of the actuator that is connected to the bonnet of the valve assembly. The mass of the piston will affect the center of gravity of the valve actuator, which in turn affects the bending moment, stress, and fatigue on the connection between the valve actuator and the bonnet.

SUMMARY OF THE DISCLOSURE

The methods and systems of the current disclosure provide a piston that places the center of gravity of the actuator near the connection point between the actuator and valve bonnet, minimizing the bending moment on the connection between the actuator and valve bonnet, decreasing the stress and fatigue on this connection compared to traditional actuators that have the piston located farther away from the valve bonnet. The methods and systems of the current disclosure also provide a pressure media supply fitting located at the distal end of the actuator body. This allows for easier access to the pressure media supply fitting and simplified manufacturing of the actuator, compared to actuators that have the pressure media supply fitting located nearer to the proximal end of actuator body, close to the valve bonnet.

In an embodiment of the current disclosure, an apparatus for actuating a valve includes an actuator body with a proximal end and a distal end, the proximal end having a connector selectively coupled to a valve assembly. A piston assembly is located within the proximal end of the actuator body, the piston assembly having a piston disposed in a piston cylinder. A telescoping port assembly with a central axis extends from the distal end of the actuator body to the piston assembly. The telescoping port assembly has an inner telescoping member and an outer telescoping member with an inner cavity that reciprocatingly receives an end of the inner telescoping member. A bore extends axially through the telescoping port assembly and communicates pressure from a pressure source to the piston cylinder, so that when a pressure media is supplied from the pressure source to the bore, the piston is axially moved to actuate the valve assembly, and the outer telescoping member telescopes outward from the inner telescoping member.

In another embodiment of the current disclosure, an apparatus for actuating a valve includes an actuator body with a cylindrical sidewall and having a proximal end and a distal end. The proximal end has a connector for selectively attaching the actuator body to a valve assembly. A piston assembly is located within the proximal end of the actuator body, an outer diameter of the piston assembly being circumscribed by, and concentric with, the cylindrical sidewall of the actuator body. The piston assembly has a piston with a pressure surface facing the distal end of the actuator body. A telescoping port assembly with a central axis extends from the distal end of the actuator body to the piston assembly, the telescoping port assembly having an inner telescoping member and an outer telescoping member with an inner cavity that reciprocatingly receives an end of the inner telescoping member.

In yet another embodiment of the current disclosure, an apparatus for actuating a valve includes an actuator body with a proximal end and a distal end, the proximal end having a connector selectively attached to a valve assembly. A piston assembly is located within the proximal end of the actuator body. A telescoping port assembly extends from the distal end of the actuator body to the piston assembly. The telescoping port assembly has a telescoping port portion having an outer telescoping member that circumscribes and reciprocates with respect to an inner telescoping member that is fixed to the distal end of the actuator body, and a solo port portion having one end connected to the outer telescoping member of the telescoping port portion and an opposite end connected to the piston assembly.

BRIEF DESCRIPTION OF THE DRAWINGS

Some of the features and benefits of the present invention having been stated, others will become apparent as the description proceeds when taken in conjunction with the accompanying drawings, in which.

DETAILED DESCRIPTION OF THE DISCLOSURE

Figure 1:
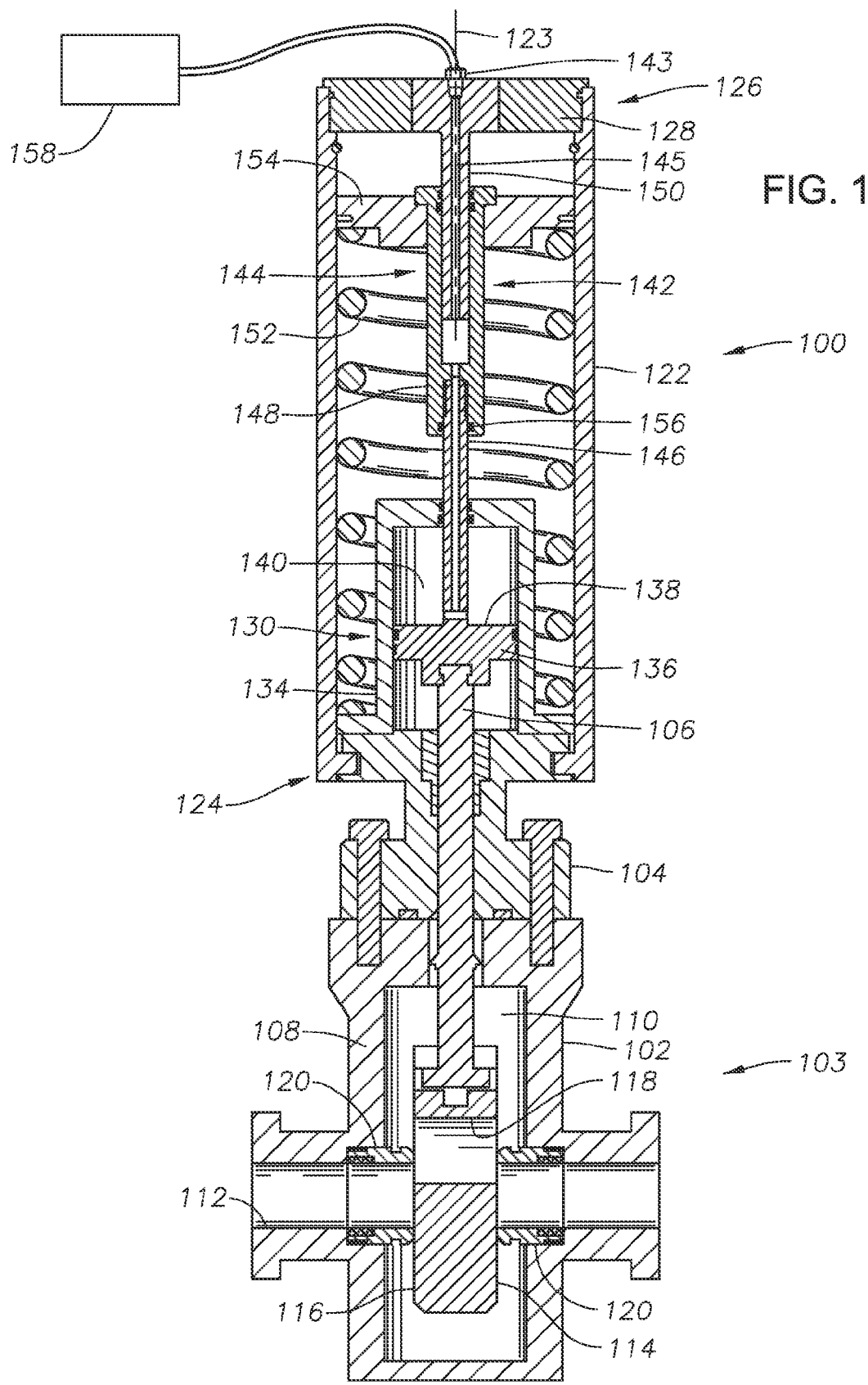
FIG. 1 is a schematic sectional view of a valve with an actuator of an embodiment of this disclosure.

The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1, actuator 100 is shown attached to valve 102. Actuator 100 is used to open or close valve 102. Valve 102 can be a surface valve or can be located subsea. Valve 102 is part of a valve assembly 103 that includes valve 102 and bonnet 104. Valve 102 can be, for example associated with a wellhead assembly that is disposed over a well (not shown). The wellhead assembly can include a wellhead housing, a production tree over the housing and flow lines connected to the tree or the wellhead assembly. The flow lines and wellhead assembly can include embodiments of valve 102 described herein. Valve 102 can also be used for regulating fluids that communicate with the wellhead assembly, or for regulating well and other fluids that are otherwise travelling along a pipeline. Bonnet 104 is connected to the body of valve 102. Valve stem 106 passes through bonnet 104. Actuator 100 is used to actuate valve 102 by urging valve stem 106 downward toward valve 102. In the embodiment of FIG. 1, moving valve stem 106 towards valve 102 will cause valve 102 to open. In alternative embodiments, moving valve stem 106 towards valve 102 will cause valve 102 to close.

Valve 102 is a gate valve with a valve body 108 housing a chamber 110 therein. A passage 112 formed through the valve body 108 intersects the chamber 110. A gate 114 is shown within the chamber 110. Gate 114 is a generally planar member having a solid portion 116 and an opening 118 formed through the solid portion 116. Gate 114 is selectively slidable within the chamber 110. Annular valve seats 120 are shown co-axially located in the passage 112, each having an end extending into the chamber 110. In the embodiment of the valve 102 shown in FIG. 1, the opening 118 is partially registered with the passage 112. In the illustrated embodiment, valve 102 is shown as a gate valve, but as one of skill in the art will appreciate, valve 102 can be any other type of valve that is actuated by the linear extension or translation of a linear member.

Figure 2:
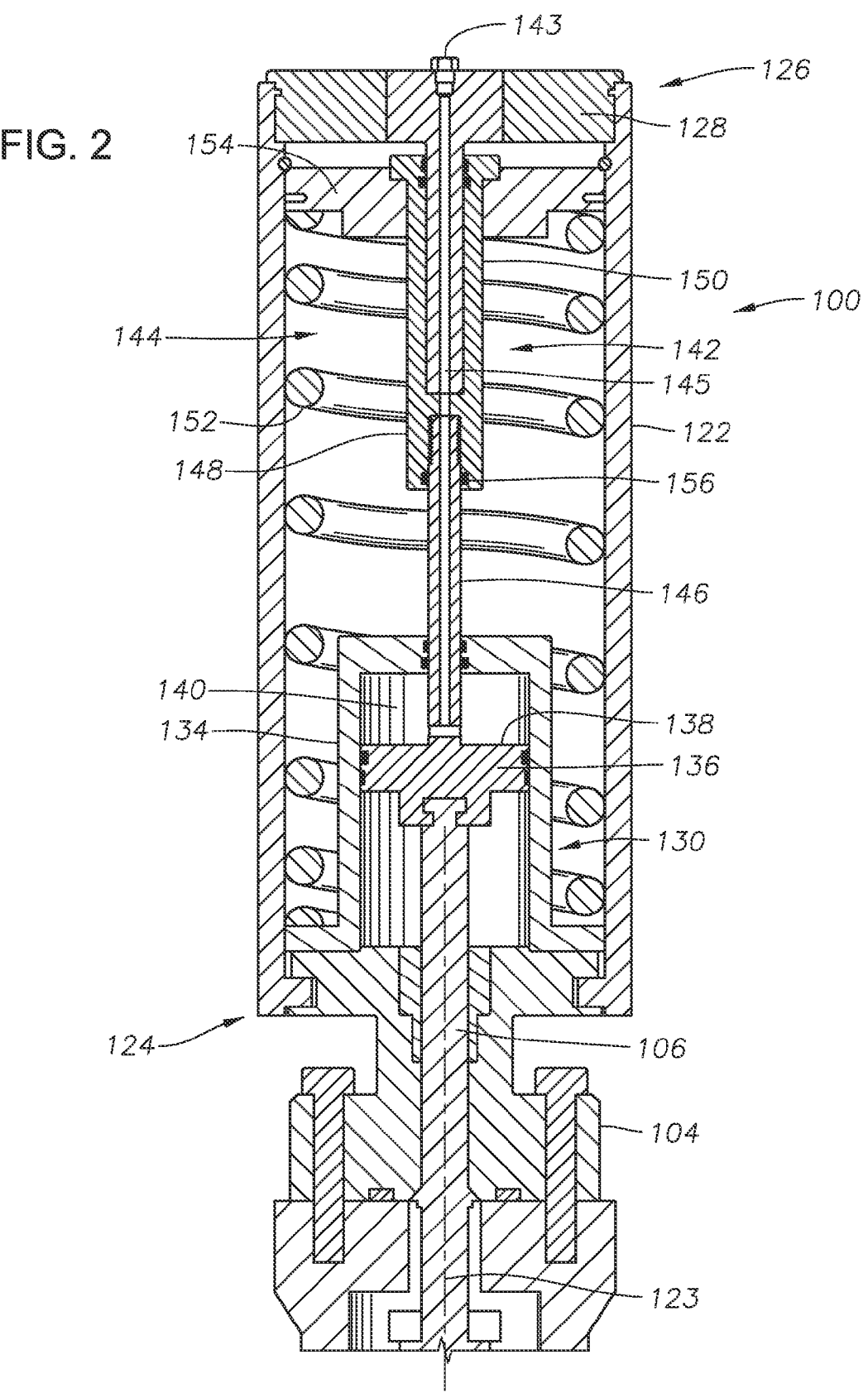
FIG. 2 is a sectional view of an actuator of an embodiment of this disclosure in a contracted position.
Figure 3:
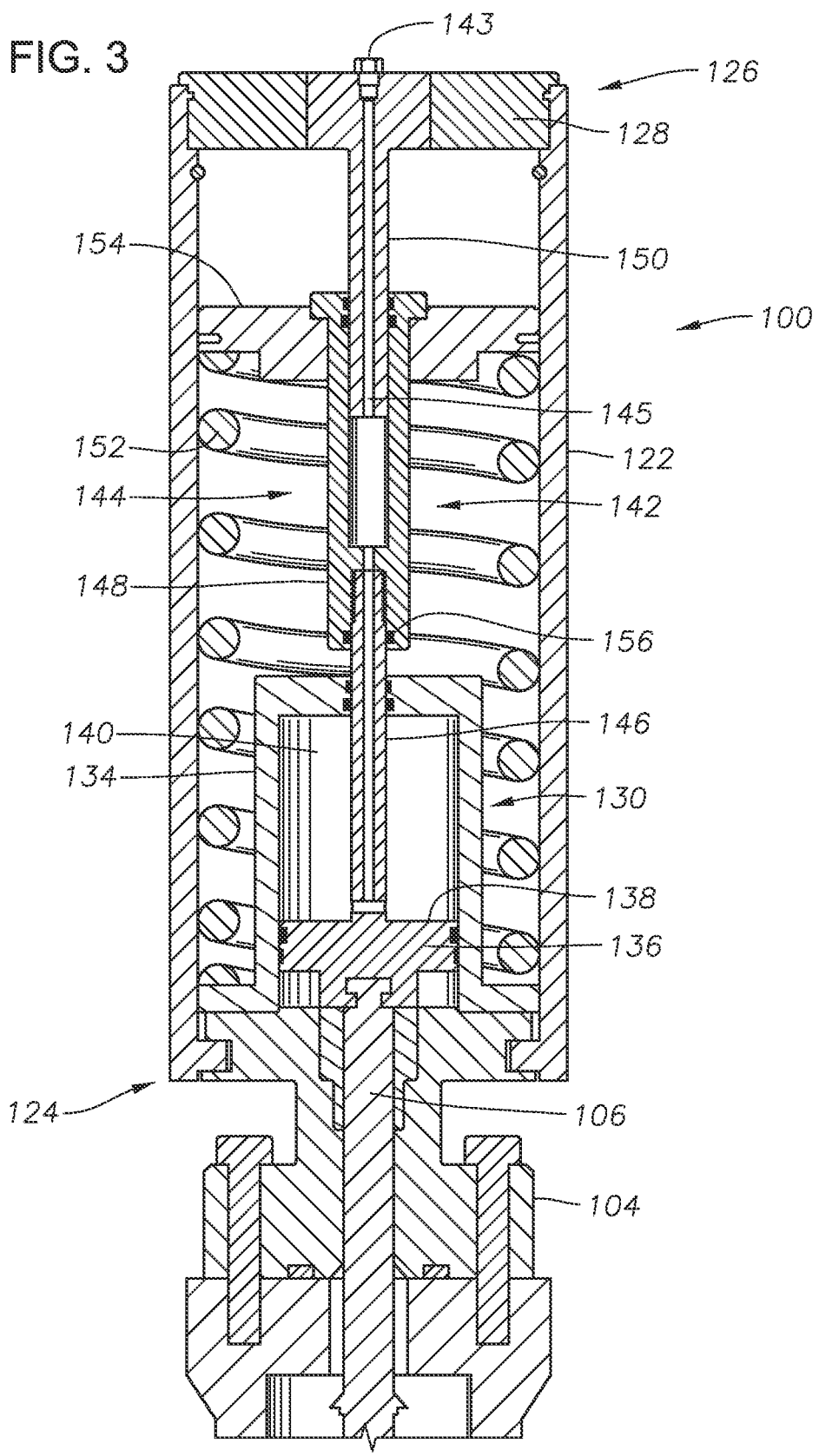
FIG. 3 is a sectional view of the actuator of FIG. 1 in an extended position.

As can be seen in FIGS. 1-3, actuator 100 of an embodiment of this disclosure includes actuator body 122. Actuator body 122 can be a generally tubular member with a cylindrical sidewall and having a central axis 123. Actuator body 122 can have a proximal end 124 and a distal end 126. Proximal end 124 can be releasably attached to bonnet 104. End cap 128 is secured to the distal end 126. End cap 128, which is shown generally coaxial with actuator body 122, can be a single member or can have more than one member, such as a disk with a central opening and a hub located within the central opening (as shown in FIGS. 1-3). End cap 128 can be secured to the distal end 126 with bolts (FIGS. 1-3), with a snap ring, or with other alternative means. Proximal end 124 of actuator body 122 can be selectively attached to bonnet 104 of valve assembly 103. A connector, such as bolts (FIG. 2), retaining rings (left side of FIGS. 1 and 3), or threads (right side of FIGS. 1 and 3) can be used to releasably secure actuator body 122 to bonnet 104 of valve assembly 103.

Piston assembly 130 is located within actuator body 122 at the proximal end 124 of actuator body 122. An outer diameter of piston assembly 130 is circumscribed by, and concentric with, the cylindrical sidewall of actuator body 122. Piston assembly 130 includes piston cylinder 134 and piston 136. Piston 136 moves axially within an inner bore of piston cylinder 134. Piston 136 has a piston connector for selective engagement with valve stem 106 so that axial movement of piston 136 moves valve 102 between an open position and a closed position. An end of piston 136 defines a pressure surface 138, which forms an end of pressure cavity 140. Pressure cavity 140 is defined by pressure surface 138 of piston 136, a closed end of piston cylinder 134, and an inner surface of the inner bore of piston cylinder 134. In the embodiments of FIGS. 1-3, pressure surface 138 faces distal end 126 of actuator body 122. The size of pressure surface 138 can be selected so that an effective piston area of embodiments of the current disclosure can be adapted to meet the requirements for a variety of valve actuation applications.

A pressure media, such as pressurized hydraulic fluid or pressurized gas, is supplied to pressure cavity 140 by way of telescoping port assembly 142 to apply a force to pressure surface 138 of piston 136 and move piston 136 towards proximal end 124 of actuator body 122. In the illustrated example, telescoping port assembly 142 is concentric with central axis 123 and extends from distal end 126 of actuator body 122 to piston assembly 130. Telescoping port assembly 142 has an internal bore 145 that extends from pressure media supply fitting 143, at distal end 126 of actuator body 122, to pressure cavity 140 for providing fluid communication between pressure media supply fitting 143 and pressure surface 138 of piston 136. Telescoping port assembly 142 extends through end cap 128 to pressure media supply fitting 143, which is located on an outer side of end cap 128. Telescoping port assembly 142 includes an outlet in fluid communication with pressure cavity 140 so that pressure media injected through pressure media supply fitting 143 and into bore 145 of telescoping port assembly 142 acts on pressure surface 138 of piston 136. The outlet can be normal to pressure cavity 140 and be located at an end of bore 145 proximate to piston 136.

Telescoping port assembly 142 includes telescoping port portion 144 and solo port portion 146. Solo port portion 146 is an elongated member with a generally cylindrical outer surface. A first end of solo port portion 146 is secured to piston 136 of piston assembly 130. A second end of solo port portion 146, opposite the first end, extends through an orifice in the closed end of piston cylinder 134. A seal and wear ring are located between the outer surface of the solo port portion 146 and the orifice in the closed end of piston cylinder 134. The second end of the solo port portion 146 engages telescoping port portion 144 of telescoping port assembly 142. The second end of the solo port portion 146 of telescoping port assembly 142 can engage outer telescoping member 148 with a threaded connection. As pressure media is injected through pressure media supply fitting 143 and into bore 145 of telescoping port assembly 142, it will travel through the telescoping port portion 144 and could flow past the threads of the threaded connection between the second end of solo port portion 146 and outer telescoping member 148. A static port seal 156 will prevent fluids from escaping between the adjacent surfaces of the second end of the solo port portion 146 and the outer telescoping member 148.

Telescoping port portion 144 of telescoping port assembly 142 includes outer telescoping member 148 and an inner telescoping member 150. Inner telescoping member 150 is an elongated member with a generally cylindrical outer surface. Inner telescoping member 150 is releasably attached to distal end 126 of actuator body 122 so that inner telescoping member 150 is a stationary member and cannot move axially relative to end cap 128.

Outer telescoping member 148 is an elongated member with a generally cylindrical outer surface. The axial bore through member 148 necks down to a smaller diameter along a finite axial distance to define passages at opposing axial ends that respectively receive inner telescoping member 150 and solo port portion 146. Outer telescoping member 148 circumscribes at least a portion of inner telescoping member 150. Outer telescoping member 148 has an inner cavity that reciprocatingly receives an end of inner telescoping member 150, so that relative axial movement between outer telescoping member 148 and inner telescoping member 150 increases or decreases the overall axial length of telescoping port assembly 142.

Outer telescoping member 148 and inner telescoping member 150 can move axially relative to each other while maintaining a fluid flow path for the pressure media to travel between pressure media supply fitting 143 and pressure cavity 140. As actuator 100 moves between a contracted position and an extended position, outer telescoping member 148 telescopes outward or inward from inner telescoping member 150. This relative axial movement between outer telescoping member 148 and inner telescoping member 150 lengthens or shortens telescoping port assembly 142. When actuator 100 is in the contracted position a maximum length of inner telescoping member 150 is co-axially located within the inner cavity of outer telescoping member 148 (FIG. 2). When actuator 100 is in the extended position a minimum length of inner telescoping member 150 is co-axially located within the inner cavity of outer telescoping member 148 (FIG. 3). A seal and wear ring can be located between the inner telescoping member 150 and the outer telescoping member 148. In alternative embodiments, the outer telescoping member may be fixed and the inner telescoping member may move axially.

A biasing member 152 is located within the actuator body 122. Biasing member 152 biases actuator 100 to the contracted position by urging piston 136 away from proximal end 124 of actuator body 122 and towards distal end 126 of actuator body 122. Biasing member 152 can be, for example, a spring. A first end of biasing member 152 is retained at the proximal end 124 of actuator body 122. The first end of biasing member 152 can be located in an annular space between the outer diameter of piston assembly 130 and the cylindrical sidewall of actuator body 122. A second end of biasing member 152, opposite the first end, is retained by telescoping port assembly 142. In the embodiments of FIGS. 1-3 retaining disk 154 is retained by outer telescoping member 148 of telescoping port assembly 142 and the second end of biasing member 152 engages retaining disk 154.

A retention member at distal end 126 of actuator body 122 can limit the axial movement of retaining disk 154 relative to actuator body 122. A portion of the retention member extends inward from the cylindrical sidewall of actuator body 122 to engage retaining disk 154. In the embodiment of FIG. 1, the retention member is shown as a ring with a rectangular cross section on the left side and a ring with a circular cross section on the right side. Telescoping port assembly 142 extends through retaining disk 154. A shoulder of telescoping port assembly 142 that faces proximal end 124 of actuator body 122 engages a surface of retaining disk 154 so that as actuator 100 moves from the contracted position to the extended position, retaining disk 154 moves towards proximal end 124 of actuator body 122. This causes telescoping port portion 144 to lengthen axially and further compresses biasing member 152. As biasing member 152 urges retaining disk 154 back towards distal end 126 of actuator body 122 and actuator 100 moves back towards a contracted position, retaining disk 154, which is in engagement with the shoulder of telescoping port assembly 142, will cause telescoping port portion 144 to shorten axially.

In an example of operation, actuator 100 is connected to bonnet 104 of valve assembly 103. In order to actuate valve 102 of valve assembly 103, pressure media such as, for example, hydraulic fluid or pressurized air, is injected from pressure source 158 through pressure media supply fitting 143 and into bore 145 of telescoping port assembly 142. Pressure media will pass through both telescoping port portion 144 and solo port portion 146 of telescoping port assembly 142 and into the piston cylinder 134, applying a force to the pressure surface of piston 136. This will cause piston 136 to move towards proximal end 124 of actuator body 122. As piston 136 moves towards proximal end 124 of actuator body 122, outer telescoping member 148 will also move towards proximal end 124 of actuator body 122, which in turn causes retaining disk 154 to move towards the proximal end 124 of actuator body 122, further compressing biasing member 152.

Because inner telescoping member 150 is fixed to the distal end 126 of actuator body 122, outer telescoping member 148 will move axially relative to inner telescoping member 150 so that actuator 100 moves from the contracted position to the extended position. This will increase the axial length of telescoping port assembly 142. As piston 136 moves towards the proximal end 124 of actuator body 122, piston 136 moves valve stem 106 which actuates valve 102, causing valve 102 to be opened or closed, depending on the design of valve 102. For example, if valve 102 is a normal closed valve as shown in FIG. 1, valve 102 will move to an open position. Pressure media can continue to be injected through pressure media supply fitting 143 until valve 102 is moved to a designated position. When pressure media is released from piston cylinder 134, biasing member 152 will urge piston 136 away from proximal end 124 of actuator body 122 and cause actuator 100 to return to the contracted position.

Having piston 136 located at proximal end 124 of actuator body 122 places the center of gravity of actuator 100 nearer to the connection point between actuator 100 and bonnet 104, than it would be if piston 136 was located at distal end 126 of actuator body 122. Having the center of gravity closer to the connection point between actuator 100 and bonnet 104 reduces the bending moment on this connection. This in turn decreases the stress and fatigue on the connection between actuator 100 and bonnet 104. Having pressure media supply fitting 143 located at distal end 126 of actuator body 122 makes it easily accessible such as, for example, more easily accessible than if pressure media supply fitting 143 was located nearer to the proximal end 124 of actuator body 122.

The terms "vertical", "horizontal", "upward", "downward", "above", and "below" and similar spatial relation terminology are used herein only for convenience because elements of the current disclosure may be installed in various relative positions.

The system and method described herein, therefore, are well adapted to carry out the objects and attain the ends and advantages mentioned, as well as others inherent therein. While a presently preferred embodiment of the system and method has been given for purposes of disclosure, numerous changes exist in the details of procedures for accomplishing the desired results. These and other similar modifications will readily suggest themselves to those skilled in the art, and are intended to be encompassed within the spirit of the system and method disclosed herein and the scope of the appended claims.

What is claimed is:

1. An apparatus for actuating a valve, the apparatus comprising:
   an actuator body with a proximal end and a distal end, the proximal end having a connector selectively coupled to a valve assembly;
   a piston assembly located within the proximal end of the actuator body that comprises a piston disposed in a piston cylinder, the piston cylinder being static relative to the actuator body;
   a telescoping port assembly with a central axis, the telescoping port assembly extending from the distal end of the actuator body to the piston assembly and having a first end fixed to the distal end of the actuator body and a second end movable with the piston within the piston cavity, the telescoping port assembly having an inner telescoping member and an outer telescoping member with an inner cavity that reciprocatingly receives an end of the inner telescoping member; and
   a bore that extends axially through the telescoping port assembly and that communicates pressure from a pressure source to the piston cylinder, so that when a pressure media is supplied from the pressure source to the bore, the piston is axially moved to actuate the valve assembly, and the outer telescoping member telescopes outward from the inner telescoping member.

2. The apparatus of claim 1, wherein the telescoping port assembly further comprises a solo port portion, the solo port portion having an end coupled to the piston assembly.

3. The apparatus of claim 1, wherein relative axial movement between the outer telescoping member and the inner telescoping member increases or decreases an axial length of the bore of the telescoping port assembly.

4. The apparatus of claim 1, wherein the telescoping port assembly includes a stationary member that is connected to the distal end of the actuator body.

5. The apparatus of claim 4, wherein the stationary member is the inner telescoping member.

6. The apparatus of claim 1, further comprising a biasing member located within the actuator body, the biasing member urging the piston away from the proximal end of the actuator body.

7. The apparatus of claim 1, wherein:
   the piston cylinder has a pressure cavity located between a closed end of the piston cylinder and the piston; and
   the apparatus further comprises a pressure media supply fitting located at the distal end of the actuator body for injecting the pressure media through the telescoping port assembly and into the pressure cavity to move the piston towards the proximal end of the actuator body.

8. The apparatus of claim 1, wherein the piston has a connector for selective engagement with a valve stem of the valve assembly such that axial movement of the piston moves the valve between an open position and a closed position.

9. The apparatus of claim 1, further comprising:
   a retaining disk retained by the telescoping port assembly; and
   a biasing member engaging the retaining disk, the biasing member urging the apparatus towards a contracted position.

10. An apparatus for actuating a valve, the apparatus comprising:
    an actuator body with a cylindrical sidewall and having a proximal end and a distal end, the proximal end having a connector for selectively attaching the actuator body to a valve assembly;
    a piston assembly located within the proximal end of the actuator body, an outer diameter of a piston cylinder of the piston assembly being static relative to, circumscribed by, and concentric with, the cylindrical sidewall of the actuator body, the piston assembly having a piston with a pressure surface facing the distal end of the actuator body and an outer diameter surface that sealingly engages an inner diameter of the piston cylinder; and
    a telescoping port assembly with a central axis, the telescoping port assembly extending from the distal end of the actuator body to the piston assembly, the telescoping port assembly having an inner telescoping member and an outer telescoping member with an inner cavity that reciprocatingly receives an end of the inner telescoping member; wherein
    the telescoping port assembly includes an outlet in fluid communication with a pressure cavity of the piston assembly such that pressure media injected into the telescoping port assembly acts on the pressure surface of the piston to move the piston towards the proximal end of the actuator body.

11. The apparatus of claim 10, wherein the telescoping port assembly has an internal bore for providing fluid communication between a pressure media supply fitting at the distal end of the actuator body and the pressure surface of the piston so that as the apparatus moves between a contracted position and an extended position, relative axial movement between the outer telescoping member and the inner telescoping member shortens or lengthens the internal bore of the telescoping port assembly.

12. The apparatus of claim 10, wherein one of the inner telescoping member and the outer telescoping member is fixed to the distal end of the actuator body and the other of the inner telescoping member and the outer telescoping member is movable with the piston, so that as the apparatus moves between a contracted position and an extended position, relative axial movement between the outer telescoping member and the inner telescoping member shortens or lengthens the telescoping port assembly.

13. The apparatus of claim 10, further comprising a biasing member, the biasing member urging the piston towards the distal end of the actuator body.

14. The apparatus of claim 10, wherein the piston assembly further includes a pressure cavity, the pressure cavity being defined within a bore of a piston cylinder between a closed end of the piston cylinder and the pressure surface of the piston.

15. An apparatus for actuating a valve, the apparatus comprising:
    an actuator body with a proximal end and a distal end, the proximal end having a connector selectively attached to a valve assembly;
    a piston assembly located within the proximal end of the actuator body;
    a telescoping port assembly extending from the distal end of the actuator body to the piston assembly and having:
       a telescoping port portion having an outer telescoping member that circumscribes and reciprocates with respect to an inner telescoping member that is fixed to the distal end of the actuator body; and
       a solo port portion having one end connected to the outer telescoping member of the telescoping port portion and an opposite end connected to a piston of the piston assembly and movable with the piston inside of a piston cylinder of the piston assembly, the piston cylinder being static relative to the actuator body.

16. The apparatus of claim 15, further comprising a biasing member retained by the outer telescoping member of the telescoping port portion, the biasing member urging the apparatus towards a contracted position.

17. The apparatus of claim 15, wherein:
the piston cylinder has a pressure cavity located between a closed end of the piston cylinder and the piston; and
the telescoping port assembly includes an internal bore for providing fluid communication between the distal end of the actuator body and the piston cylinder so that as the apparatus moves between a contracted position and an extended position, relative axial movement between the outer telescoping member and the inner telescoping member shortens or lengthens the internal bore of the telescoping port assembly.

18. The apparatus of claim 15, wherein the outer telescoping member has an inner cavity such that when the apparatus is in a contracted position a maximum length of the inner telescoping member is co-axially located within the inner cavity of the outer telescoping member and when the apparatus is in an extended position a minimum length of the inner telescoping member is co-axially located within the inner cavity of the outer telescoping member.

19. The apparatus of claim 15, wherein
the piston has a connector for selective engagement with a valve stem of the valve assembly such that axial movement of the piston moves the valve between an open position and a closed position.

20. An apparatus for actuating a valve, the apparatus comprising:
an actuator body with a cylindrical sidewall and having a proximal end and a distal end, the proximal end having a connector for selectively attaching the actuator body to a valve assembly;
a piston assembly located within the proximal end of the actuator body, an outer diameter of a piston cylinder of the piston assembly being static relative to, circumscribed by, and concentric with, the cylindrical sidewall of the actuator body, the piston assembly having a piston with a pressure surface facing the distal end of the actuator body and an outer diameter surface that sealingly engages an inner diameter of the piston cylinder; and
a telescoping port assembly with a central axis, the telescoping port assembly extending from the distal end of the actuator body to the piston assembly, the telescoping port assembly having an inner telescoping member and an outer telescoping member with an inner cavity that reciprocatingly receives an end of the inner telescoping member;
wherein the telescoping port assembly has an internal bore for providing fluid communication between a pressure media supply fitting at the distal end of the actuator body and the pressure surface of the piston so that as the apparatus moves between a contracted position and an extended position, relative axial movement between the outer telescoping member and the inner telescoping member shortens or lengthens the internal bore of the telescoping port assembly.

* * * * *